(12) United States Patent
Cho

(10) Patent No.: US 8,047,592 B2
(45) Date of Patent: Nov. 1, 2011

(54) ARMREST HINGE UNIT FOR VEHICLE

(75) Inventor: Kwang Pyo Cho, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 358 days.

(21) Appl. No.: 12/478,938

(22) Filed: Jun. 5, 2009

(65) Prior Publication Data

US 2010/0090485 A1 Apr. 15, 2010

(30) Foreign Application Priority Data

Oct. 15, 2008 (KR) .................. 10-2008-0101144

(51) Int. Cl.
*B60R 7/00* (2006.01)
(52) U.S. Cl. .................. 296/24.34; 296/1.09; 16/337
(58) Field of Classification Search .................. 296/1.09, 296/1.53, 24.3, 24.34, 37.13, 37.8; 16/221, 16/290, 307, 308, 337, 342, 385; 297/411.2, 297/411.21
See application file for complete search history.

(56) References Cited

U.S. PATENT DOCUMENTS

| | | | | |
|---|---|---|---|---|
| 5,452,501 | A | * | 9/1995 | Kramer et al. .................. 29/11 |
| 6,018,847 | A | * | 2/2000 | Lu .................. 16/337 |
| 6,772,983 | B1 | * | 8/2004 | Liao et al. .................. 248/291.1 |
| 2003/0127877 | A1 | * | 7/2003 | Luginbill et al. .................. 296/37.8 |

FOREIGN PATENT DOCUMENTS

WO WO 0114671 A1 * 3/2001

* cited by examiner

*Primary Examiner* — Dennis Pedder
*Assistant Examiner* — Jason Daniels
(74) *Attorney, Agent, or Firm* — Morgan, Lewis & Bockius LLP

(57) ABSTRACT

An armrest hinge unit for a vehicle includes a lower bracket fixed to one side of an armrest container near an opening thereof and including a pivoting-allowable space in the lower bracket, a frictional member disposed in the pivoting-allowable space of the lower bracket and fixed to the lower bracket, and an upper bracket having a hinge portion hingedly coupled to the lower bracket and a receiving groove to elastically receive the frictional member therein, the upper bracket being connected to an armrest cover, wherein at least an inner surface of the receiving groove of the upper bracket is in elastic contact with the frictional member so that a position of the arm rest cover is maintained by frictional force therebetween.

17 Claims, 7 Drawing Sheets

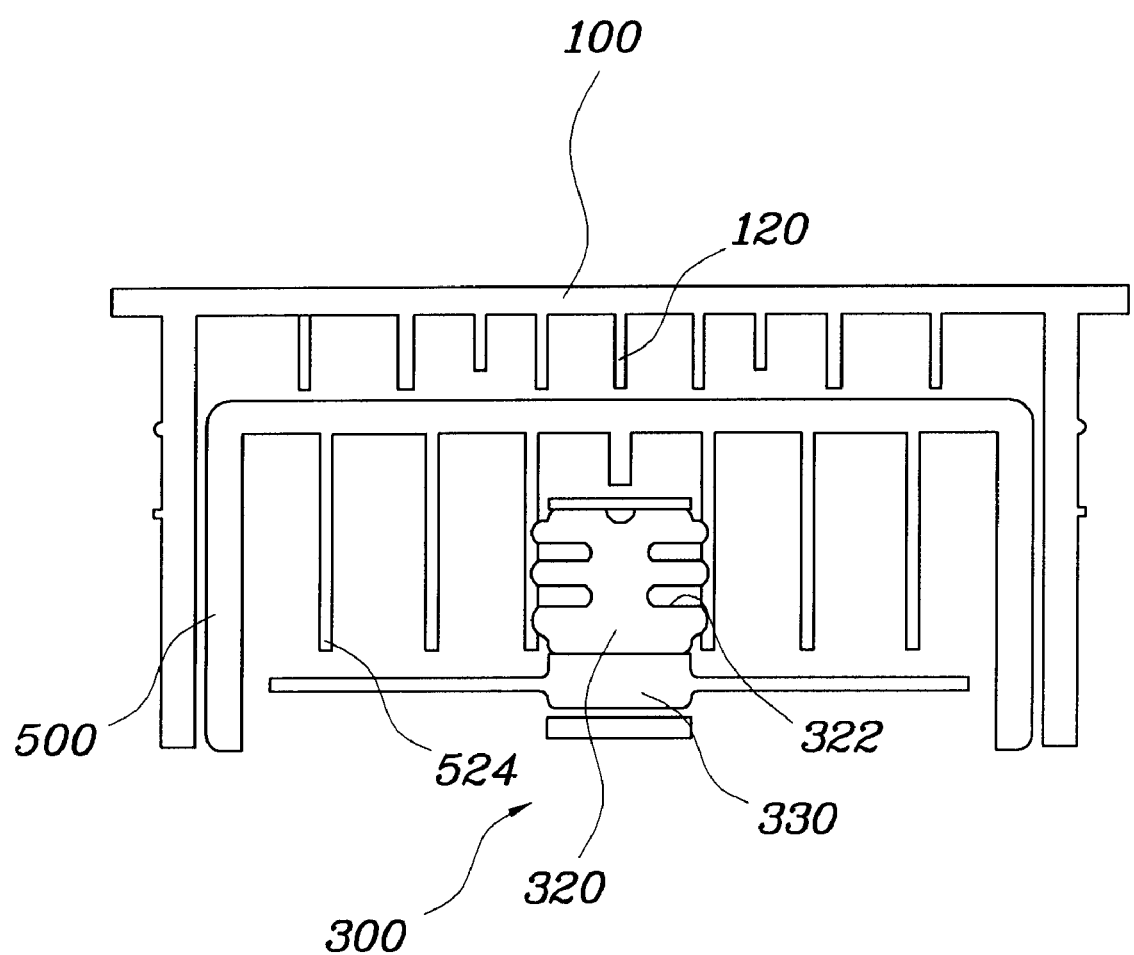

ic member installed in the housing and configured to protrude toward the inner surface of the receiving groove of the upper bracket so as to have a contact with the upper bracket, wherein the frictional member has a semicircular sectional shape.

ARMREST HINGE UNIT FOR VEHICLE

CROSS-REFERENCE TO RELATED APPLICATION

The present application claims priority to Korean Patent Application Number 10-2008-0101144, filed on Oct. 15, 2008, the entire contents of which is incorporated herein for all purposes by this reference.

BACKGROUND OF THE INVENTION

1. Field of the Invention

The present invention relates to an armrest hinge unit which couples an armrest container which is provided between a driver's seat and a passenger's seat to receive things and to an armrest cover which covers the armrest container and on which a driver's arm can be rested.

2. Description of Related Art

Generally, an armrest is provided between a driver's seat and a passenger's seat of a vehicle. The armrest has a box shape so that it can contain things therein and it allows a user's arm to be rested thereon. Additional functions, durability, and design of the armrest are important factors determining the interior of a vehicle.

The armrest is generally composed of a container, a cover, and a hinge unit. The container stores things therein, and the cover is installed at the top end of the container by the hinge unit so that the armrest can be open and closed.

As for the hinge unit of the armrest, it must be considered that the operational mechanism of the hinge unit is stable, duration of the hinge unit is ensured, it is lightweight, and smooth opening and closing of the cover is ensured. Further, it is preferable that the hinge unit exhibits good properties while being made of a low cost material to keep manufacturing cost of a vehicle low.

However, the conventional hinge units are weak in a structural aspect so they are likely to easily break when a shock is given to them. So the conventional hinge units must be made of a steel material. In the case in which the hinge units are made of a steel material, there are many problems in that the hinge units are expensive, attributable to increased cost, and heavy, and have poor durability because the hinge units are likely to twist and become permanently deformed when a downward load is applied to the cover of the armrest.

The information disclosed in this Background of the Invention section is only for enhancement of understanding of the general background of the invention and should not be taken as an acknowledgement or any form of suggestion that this information forms the prior art already conventional to a person skilled in the art.

BRIEF SUMMARY OF THE INVENTION

Various aspects of the present invention are directed to provide an armrest hinge unit for a vehicle which is lightweight because it is made of plastic resin, which has high strength because of an improved structure, and which has an enhanced opening and closing property by virtue of maintaining proper frictional force.

According to one aspect of the invention, there is provided an armrest hinge unit for a vehicle including a lower bracket fixed to one side of an armrest container near an opening thereof and including a pivoting-allowable space in the lower bracket, a frictional member disposed in the pivoting-allowable space of the lower bracket and fixed to the lower bracket, and an upper bracket having a hinge portion hingedly coupled to the lower bracket and a receiving groove to elastically receive the frictional member therein, the upper bracket being connected to an armrest cover, wherein at least an inner surface of the receiving groove of the upper bracket is in elastic contact with the frictional member so that a position of the arm rest cover is maintained by frictional force therebetween, wherein the lower bracket is made of plastic resin through a molding method and wherein the upper bracket is made of plastic resin through a molding method.

The upper bracket may include a receiving portion received in the pivoting-allowable space of the lower bracket and a fixing portion to which the armrest cover is fixed, at least an outer lateral side surface of the receiving portion is slidably in contact with at least an inner surface of the pivoting-allowable portion.

The frictional member may include a housing and an elastic member installed in the housing and configured to protrude toward the inner surface of the receiving groove of the upper bracket so as to have a contact with the upper bracket, wherein the frictional member has a semicircular sectional shape.

The elastic member may include at least a groove on at least a lateral surface thereof so that the elastic member can be deformed in being pressed by the upper bracket, wherein the groove is recessed in a lengthwise direction of the armrest hinge unit and wherein the groove is formed of a semicircular shape.

In another aspect of the present invention, the upper bracket may have a curved surface having a predetermined curvature around the hinged portion of the upper bracket, and an inner surface of the pivoting-allowable space of the lower bracket is provided with a curved surface for guiding the curved surface of the upper bracket.

In further another aspect of the present invention, a lower end portion of the frictional member may be provided with a clip portion which is coupled to the pivoting-allowable space of the lower bracket, wherein a shock absorbing member is provided between the clip portion and the lower bracket.

The upper and lower brackets may be formed by at least a rib arranged and extended in a lattice form so as to maintain inner forms of the upper and lower brackets.

The frictional member may include a center portion having a bar shape extending up to the hinge portions of the upper bracket, the hinge portion of the upper bracket being disposed between the lower bracket and the center portion of the frictional member and a hinge pin penetrating through the lower bracket, the center portion, and the hinge portion.

In further another aspect of the present invention, the armrest hinge unit for a vehicle may include a rotation prevention member configured to limit an angular range of the upper bracket with a predetermined angle with respect to the lower bracket, wherein at least a side of a lower end portion of the upper bracket is provided with a guide protrusion, corresponding side of the pivoting-allowable space of the lower bracket is provided with a guide groove which guides a sliding motion of the guide protrusion of the upper bracket, and the guide groove is provided with a stopper protrusion which stops upward sliding motion of the guide protrusions beyond the predetermined angle and wherein the lower end portion of the upper bracket is provided with a shock absorbing member.

With a structure such as described above, since the armrest hinge unit is made of plastic resin rather than steel materials, the armrest hinge unit is lightweight. Furthermore, since the armrest hinge unit has an improved structure, the armrest hinge unit is not likely to be deformed or twist. Still further, since the armrest hinge unit is made of rubber and therefore maintains proper frictional force, the opening of the cover can be maintained at various angles when the cover of the armrest is open. That is, the openability improves.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 5 is a sectional view taken along line VI-VI of FIG. 3.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an armrest hinge unit for a vehicle according to various embodiments of the present invention will be described with reference to the accompanying drawings.

Figure 1:
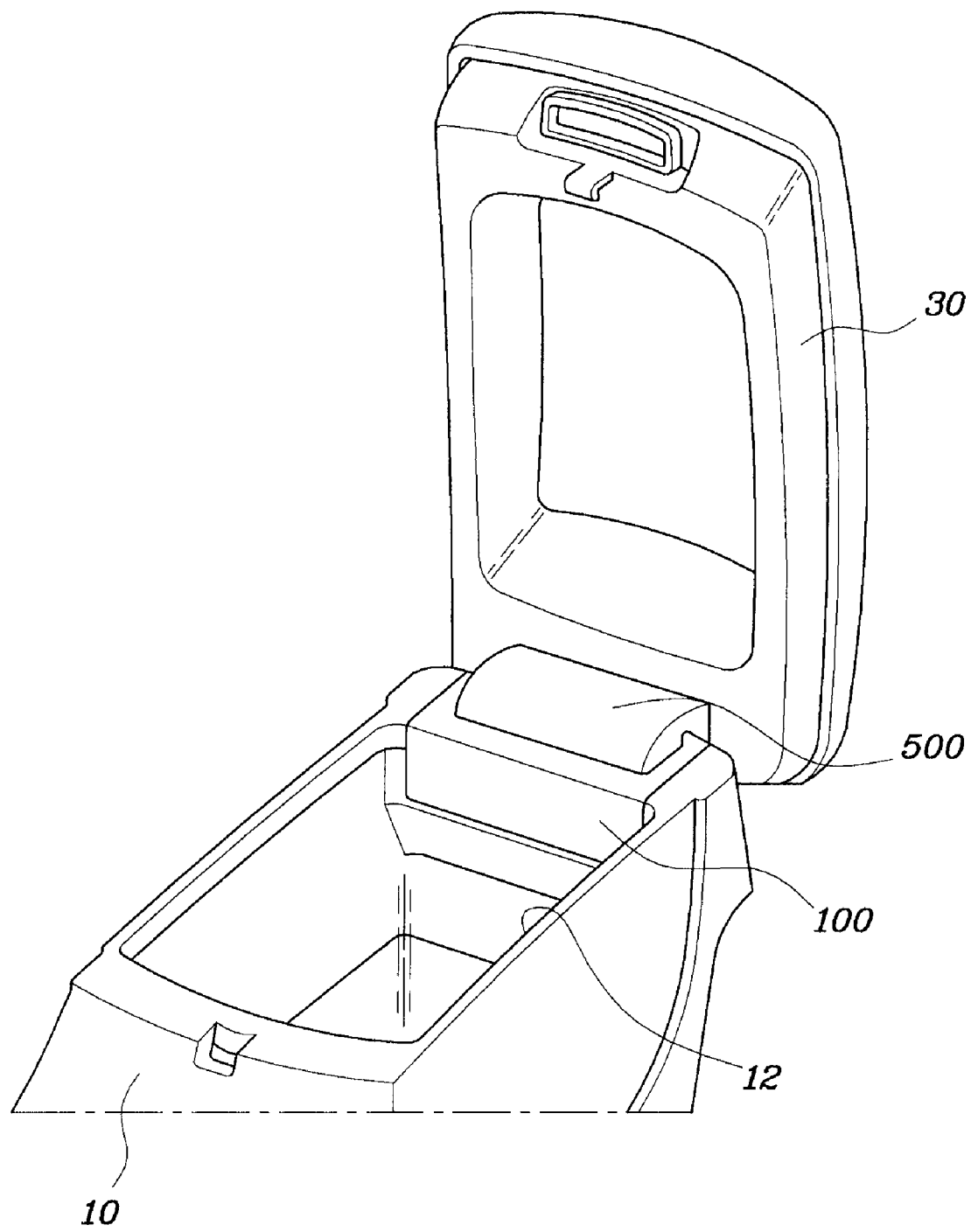
FIG. 1 is a perspective view illustrating an exemplary armrest hinge unit for a vehicle according to the present invention.
Figure 2:
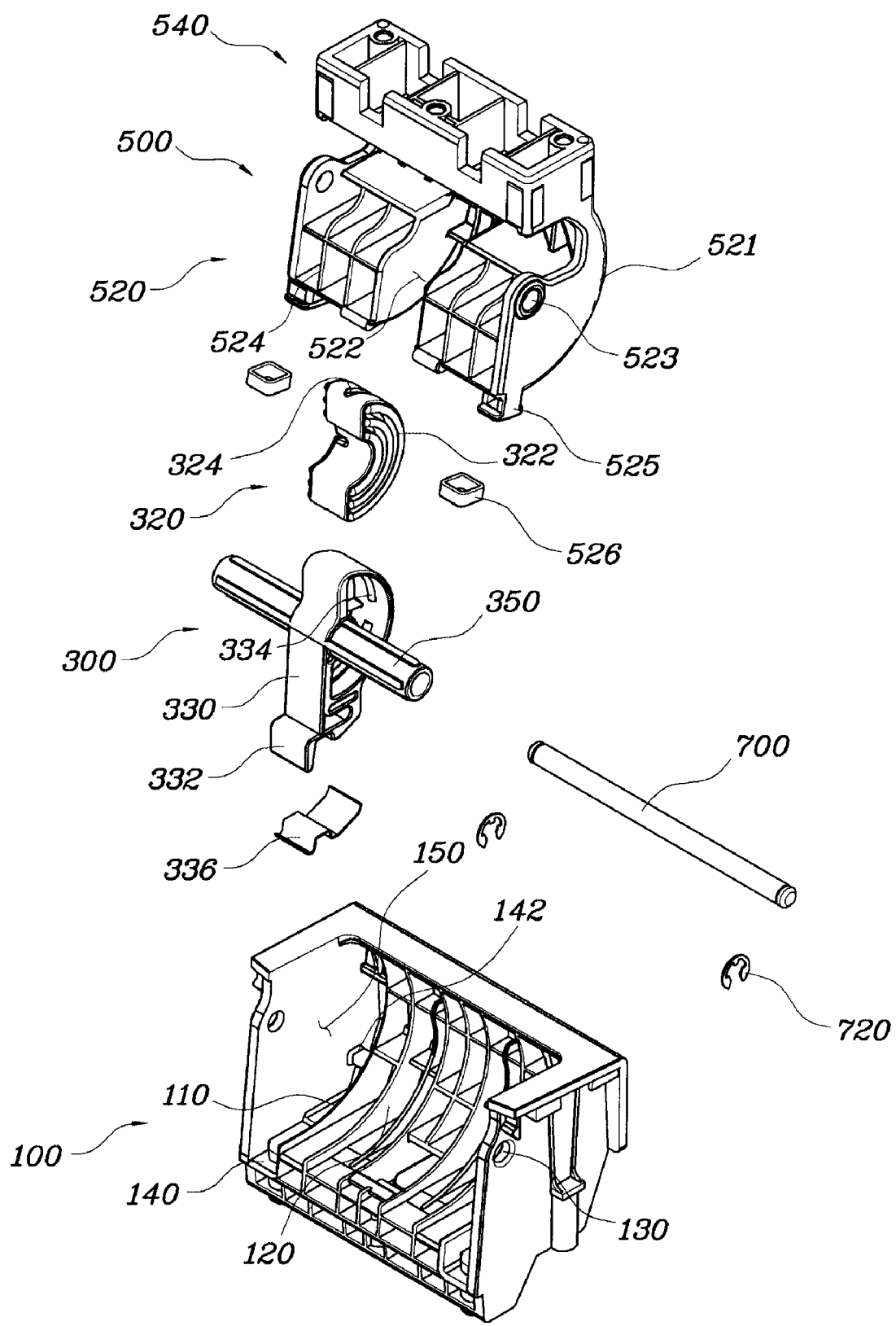
FIG. 2 is an exploded perspective view illustrating the exemplary armrest hinge unit for the vehicle of FIG. 1.

FIG. 1 shows an armrest hinge unit for a vehicle according to various embodiments of the present invention and FIG. 2 is an exploded perspective view of the armrest hinge unit for the vehicle of FIG. 1.

The armrest hinge unit for a vehicle according to various embodiments of the present invention includes a lower bracket 100 fixed to one side of an armrest container 10 near an opening 12 of the container 10 and made of resin through a molding method so as to provide a pivoting-allowable space 150 which is an inwardly curved space. The armrest hinge unit further includes a frictional member 300 fixed in the lower portion of the pivoting-allowable space 150 and having rubber members 320 protruding from both lateral sides of a main body of the frictional member. The armrest hinge unit still further includes an upper bracket 500 installed and secured in the pivoting-allowable space 150 by a hinge pin 700. An armrest cover 30 is fixed to an upper end of the upper bracket 500. The upper bracket 500 has a groove 522 for receiving the frictional member 300 therein to maintain the open state of the armrest cover 30, and an inner surface of the groove 522 is in contact with the rubber members 320 so that frictional force is imparted to the inner surface. The upper bracket 500 is made of molded plastic resin.

The armrest hinge unit for a vehicle is composed of the upper bracket 500, the lower bracket 100, and the fractional portion 300. The frictional member 300 is provided inside the lower bracket 100 so that it is not visible from the outside. However, the upper bracket 500 is exposed to the outside unlike the conventional armrest hinge unit and the both lateral sides thereof are in contact with the inner surface of the pivoting-allowable space 150 of the lower bracket 100. That is, the upper bracket 500 is in plane contact with the inner surface of the pivoting-allowable space 150 so that a hinge unit is not visible from the outside and therefore ensuring the strength of the hinge unit.

FIG. 1 shows the armrest hinge unit from which the armrest cover is opened. The lower bracket 100 is installed on one side of the armrest container 10 near the opening 12 of the armrest container 10. The lower bracket 100 has a box shape. The upper bracket 500 is installed in the lower bracket 100 in a manner such that the upper bracket 500 is secured and can pivot on the hinge pin in the lower bracket 100. According to the armrest hinge unit for a vehicle according to the present invention, the hinge unit is not exposed to the outside. The exposed portion is the lower bracket 100 and the upper bracket 500. Each of the lower and upper brackets 100 and 500 has a box shape so that the armrest hinge unit for a vehicle has good design and a neat appearance.

With reference to FIG. 2, details of members will be described. The lower bracket 100 will be described in detail first. The lower bracket 100 is made of molded plastic resin and has a box shape. The lower bracket 100 is provided with a pivoting-allowable space 150 which is an inwardly curved space. The pivoting-allowable space 150 has a curved face 110 corresponding to the curved face 521 of the upper bracket 500 which will be described below. An upper and a rear portion of the lower bracket 100 are open so that the upper bracket 500 can be received in the lower bracket 100 from the upper opening. Both sides of the lower bracket 100 are provided with hinge holes 130 through which hinge pins 700 penetrate.

The lower bracket 100 is provided with the frictional member 300 which is made of plastic resin and has a semicircular shape. The frictional member 300 is composed of a housing 330 and a rubber member 320 engaging with the housing 330. The housing 330 has a semicircular shape which is formed through a molding method and has a semicircular through-hole at the center thereof. Coupling protrusions 334 are formed on the inner surface of the through hole. A rubber member 320 having a shape corresponding to the shape of the semicircular through-hole is inserted into the through-hole of the housing 330. The rubber member 320 is provided with holes 324 corresponding to the coupling protrusions 334 so that the coupling protrusions 334 are inserted into the holes 324 and the rubber member 320 is received in the through-hole of the housing 330. A lower end portion of the frictional member 300 is provided with a clip portion 332 coupled to the lower bracket 100. The clip portion 332 is coupled to the lower bracket 100 in a tightly retained, inserting manner and a shock absorbing member 336 is provided between the clip portion 332 and the lower bracket 100. The frictional member 300 has a semicircular shape and is provided with a center portion 350 at a center of the semicircular shape. The center portion 350 is provided with a through-hole into which a hinge pin 700 is inserted. The hinge pin has a bar shape extending from both side ends of the frictional member 300 toward the lower bracket 100.

The upper bracket 500 is installed in the lower bracket 100. The upper bracket 500 includes a received portion 520 which is received in the pivoting-allowable space 150 of the lower bracket 100 and a fixing portion 540 to which the armrest cover 30 is fixed, and is made of plastic resin. The received portion 520 of the upper bracket 500 pivots on the hinge pin 700 in the pivoting-allowable space of the lower bracket 100 so that the armrest cover 30 fixed to the fixing portion 540 may be opened and closed. The upper bracket 500 also has a box shape like the lower bracket 100. Since the upper bracket 500 must be received in the pivoting-allowable space 150 of the lower bracket 100, the size of the upper bracket 500 is the same as that of the pivoting-allowable space 150. In greater detail, the width of the pivoting-allowable space 150 is almost the same as that of the upper bracket 500 so that both lateral side surfaces of the received portion 520 are in contact with the inner surfaces of the pivoting-allowable space 150 such that swaying of the upper bracket 500 is prevented. Accordingly, when the armrest cover is open, the upper bracket 500 and the lower bracket 100 endure the downward load together so that the armrest hinge unit does not deform since the lower bracket 100 supports the upper bracket 500. Both sides of the upper bracket 500 are provided with hinge portions 523. Each of the hinge portions 523 is disposed between the center portion 350 of the frictional member 300 and the lower bracket 100, and the hinge pin 700 penetrates through the hinge portion 523. The upper bracket 500 pivots inside the lower bracket 100 on the hinge pin 700, is supported by the lower bracket, and is imparted with the frictional force by the frictional member 300.

The upper bracket 500 is provided with a receiving groove 522 in which the frictional member 300 is received. There is no special limitation in the numbers of the receiving grooves 522 and the frictional members 300, but it is preferable that there be a pair of receiving grooves 522 and frictional member 300 disposed at the center portion of the upper bracket 500. The frictional member 300 is inserted into the receiving portion 522 and both lateral surfaces of the rubber member 320 of the frictional member 300 are in close contact with the inner surfaces of the receiving portion 522 to generate the frictional force. Since the rubber member 320 and the receiving portion 522 abut against each other when in a pressed state, the cover is fixed in an open state at any angle in the case in which the armrest cover is open. In the conventional armrest hinge unit, when the armrest is opening, the armrest is likely to close due to its own weight if a user releases the armrest cover because there is no frictional force. In such a case, an accident in which a user's fingers are jammed between the armrest cover and the armrest container is likely to occur. On the other hand, it is preferable that the frictional force attributable to the rubber member 320 is determined such that it shows smoothing of the opening. The frictional force can be determined in consideration of the material and width of the rubber member 320 and the width of the receiving portion 522. As described above, since a section of the frictional member 300 is semicircular, it is preferable that the receiving groove 522 is also semicircular. The rubber member 320 of the frictional member 300 is also provided with a groove 322 formed along the side surface of the semicircular body. Since the rubber 320 is provided with the groove 322, the rubber member 320 deforms when the rubber 320 and the receiving groove 322 are pressed against each other. Such a structure can prevent the rubber member 320 from being torn by excessively close contact and improves durability of the rubber member 320.

The upper bracket 500 is provided with a curved surface 521 having a predetermined curvature around the hinge pin 700, and the lower bracket 100 has a curved surface 110 for guiding a sliding motion of the curved surface 521 of the upper bracket 500. Since the curved surfaces of the upper bracket 500 and the lower bracket 100 are matched with each other and have the same curvature, the upper bracket 500 can smoothly pivot without intervention with the lower bracket 100. Both sides of a lower end portion of the upper bracket 500 are provided with guide protrusions 525 and both sides of the pivoting-allowable space 150 of the lower bracket 100 are provided with guide grooves 140. The guide grooves 140 are provided with stopper protrusions 142, respectively which stop upward sliding motion of the respective guide protrusions 525. When the armrest cover is open, the guide protrusions 525 slide upward along the guide grooves 140 and the sliding motion of the guide protrusions 525 are stopped by the stopper protrusions 142 when the armrest cover is in a fully opened state. Further, shock absorbing members 526 surround the guide protrusions 525 to suppress noise which is likely to be generated when the guide protrusions 525 are bumped against the stopper protrusions.

The empty inside space forms of the upper bracket 500 and the lower bracket 100 are maintained by ribs 524 and 120 arranged in a lattice form, which results in the decrease in the weight of the armrest hinge unit. That is, the inside spaces of the upper bracket 500 and the lower bracket 100 are empty, and the lattice-formed ribs 524 and 120 are provided to extend inside the upper and lower brackets 500 and 100, so that the structure of the upper and lower brackets 500 and 100 is maintained and receives support. With this structure, it is possible to effectively decrease the weight and enhance the strength of the armrest hinge unit. For example, the pivoting-allowable space 150 of the lower bracket 100 is provided with the rib 120 so as to match with the curved surface 521 of the upper bracket 500. The ribs 120 make the lower bracket 100 assume the curved surface shape and supports the upper bracket 500. The ribs 524 and 120 may be also molded when performing extrusion molding with plastic resin.

Figure 3:
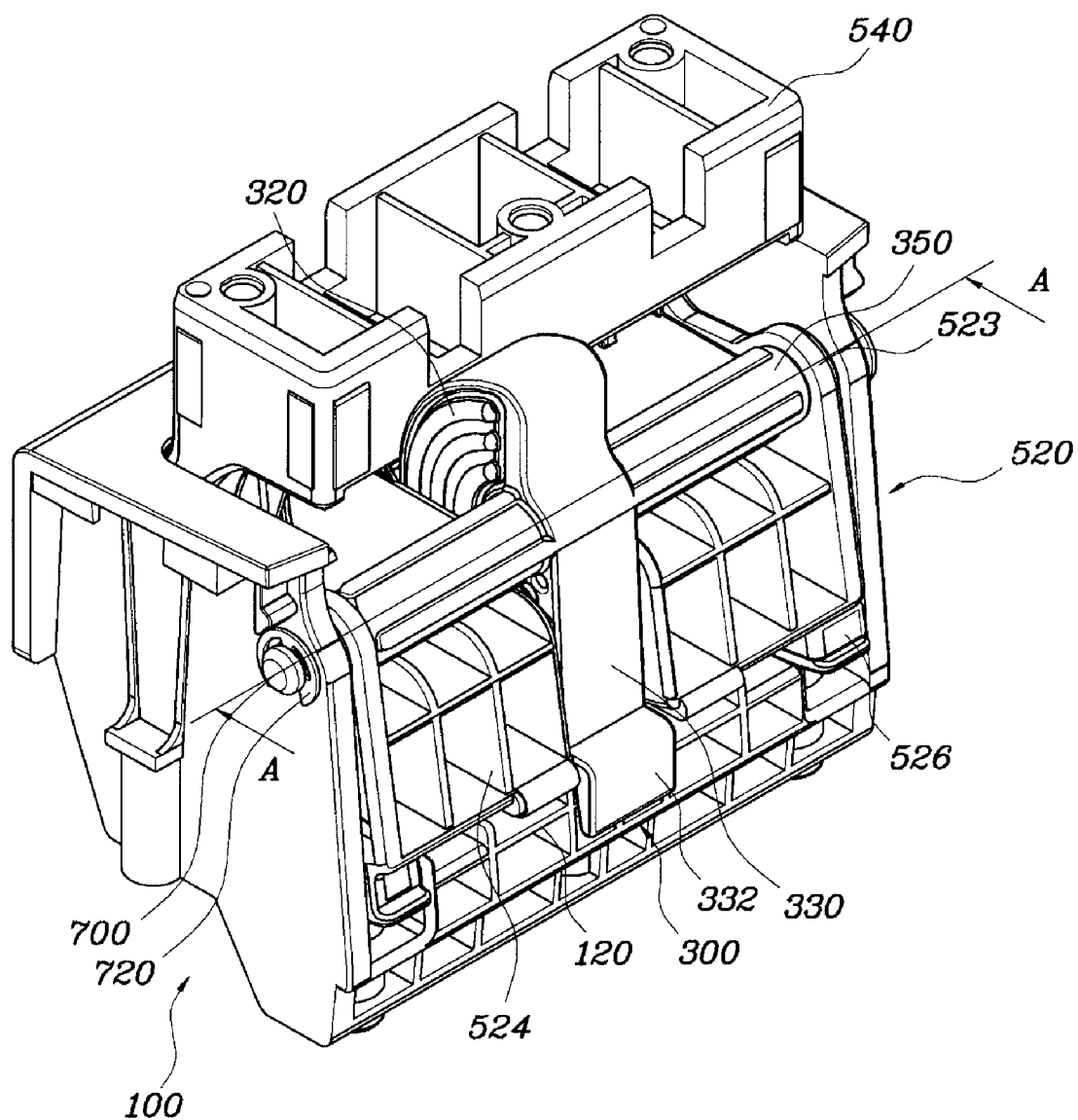
FIG. 3 is a perspective view illustrating the combined structure of the exemplary armrest hinge unit for the vehicle of FIG. 1.

FIG. 3 shows the combined state of the armrest hinge unit. The frictional member 300 is inserted into the upper bracket 500. At this time, since frictional force is generated between the surfaces of the receiving groove and the rubber member 320, the frictional member 300 and the upper bracket 500 are combined by pressing force. The upper bracket 500 to which the frictional member 300 is combined is inserted into the pivoting-allowable space 150 of the lower bracket 100. The hinge pin 700 penetrates through the hinge portions of the lower bracket 100 and the upper bracket, and the center portion 350 of the frictional member 300 and protrudes from the outer surface of the lower bracket 100 on the other side. Both ends of the hinge pin 700 are combined with fixing clips 720 so that the hinge pin 700 is not pivoted. After the combination is completed, the lower bracket 100 is installed on one side of the armrest container and the armrest cover is installed in the fixing portion 540 of the upper bracket 500.

Figure 4:
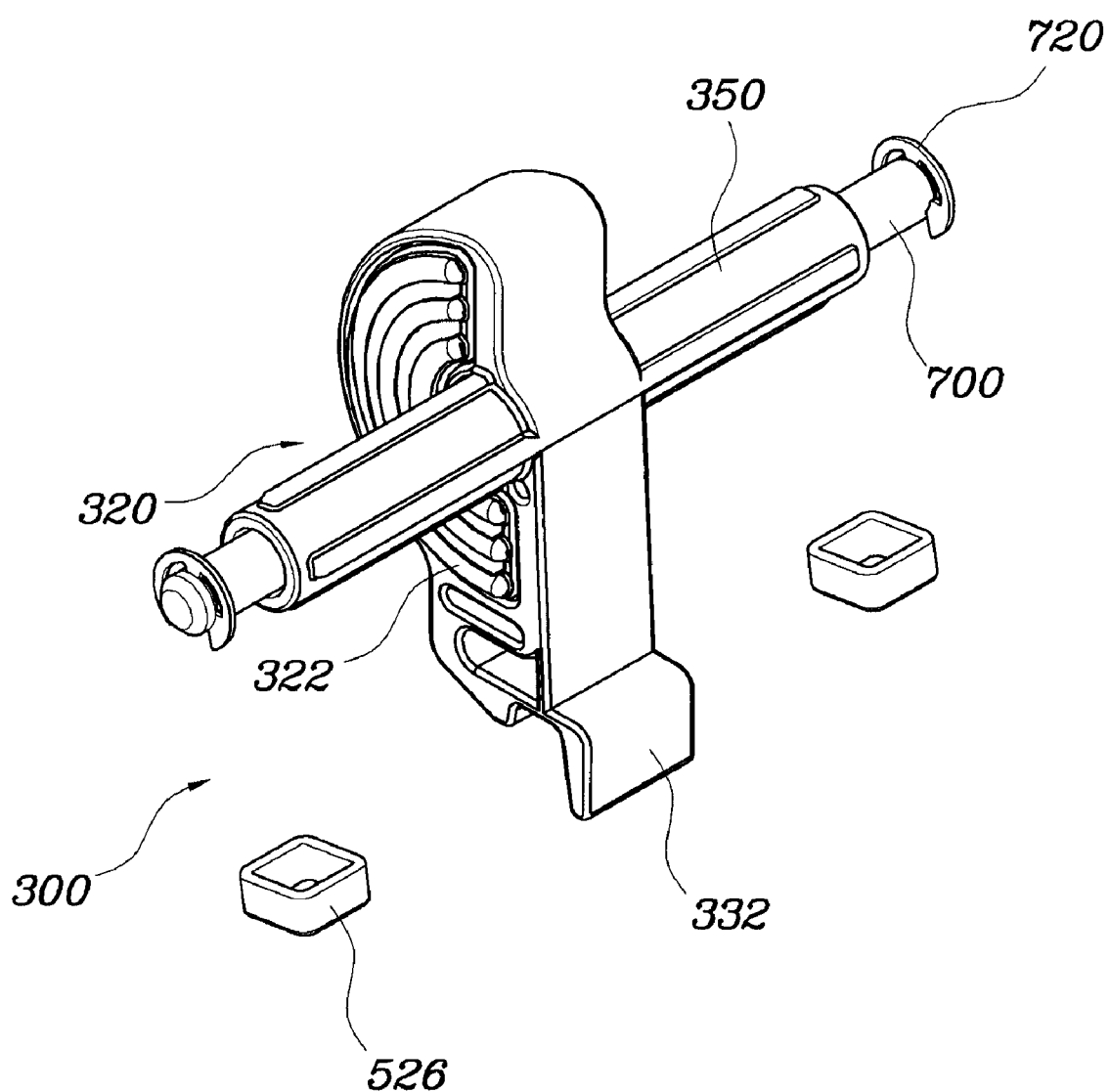
FIG. 4 is a perspective view illustrating a fractional portion of the exemplary armrest hinge unit for the vehicle of FIG. 1.

FIG. 4 is a perspective view illustrating the frictional member. The frictional member 300 is composed of a housing 330 and a rubber member 320. Each of the housing 330 and the rubber member 320 is of a semicircular shape, and the rubber member 320 is provided with grooves 322 on both lateral surfaces thereof. FIG. 5 is a sectional view taken along line VI-IV of FIG. 3 which shows the armrest hinge unit. As shown in FIG. 5, both side surfaces of the rubber member 320 are in close contact with the grooves 522 of the upper bracket 500 to generate the frictional force. The front end and the side ends of the upper bracket 500 are supported and guided by the lower bracket 100 and therefore the upper bracket 500 is not deformed by the leftward or rightward load.

Figure 6A:
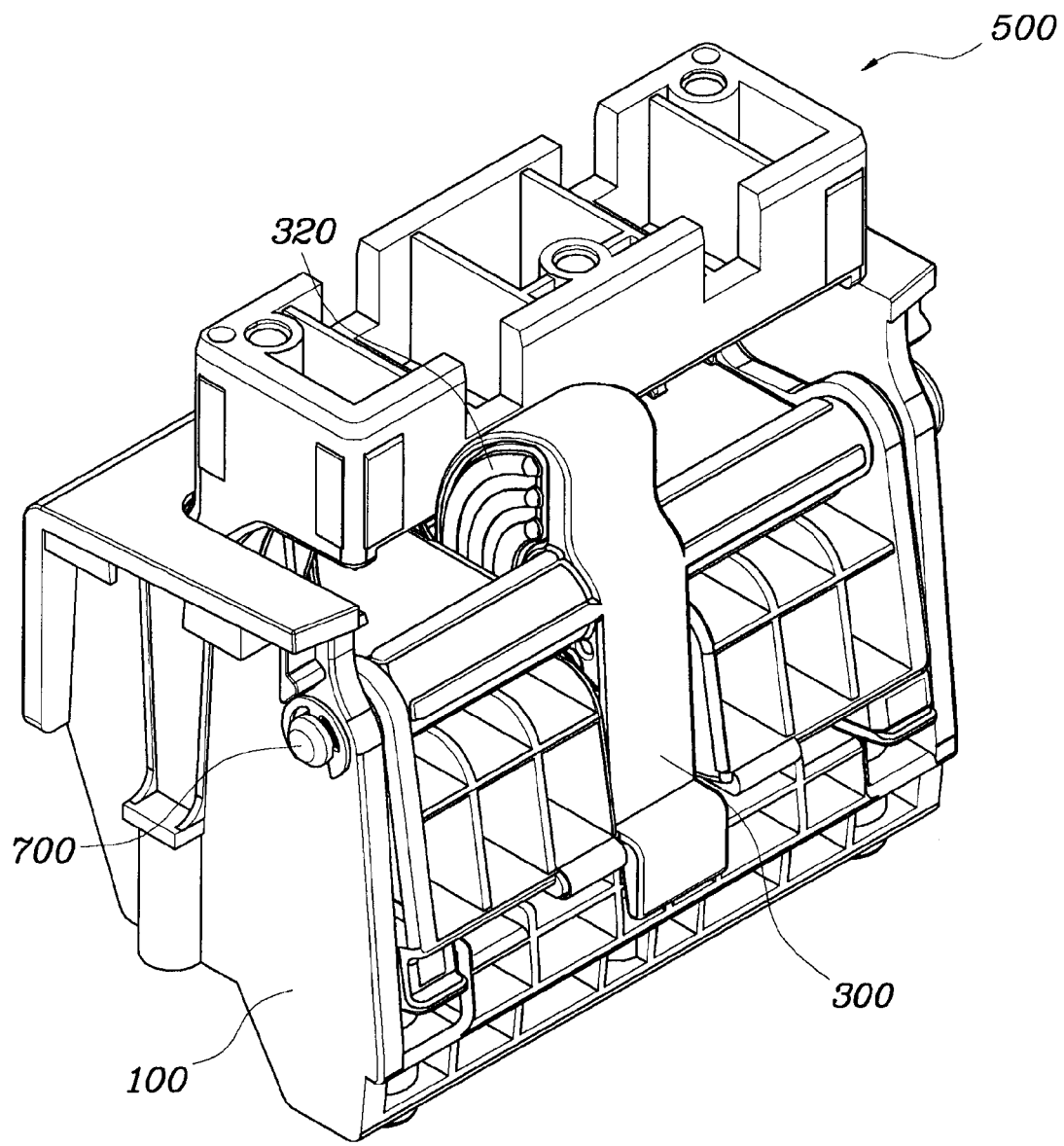
FIG. 6A is a perspective view illustrating a first operational method of the exemplary armrest hinge unit for the vehicle of FIG. 1.
Figure 6B:
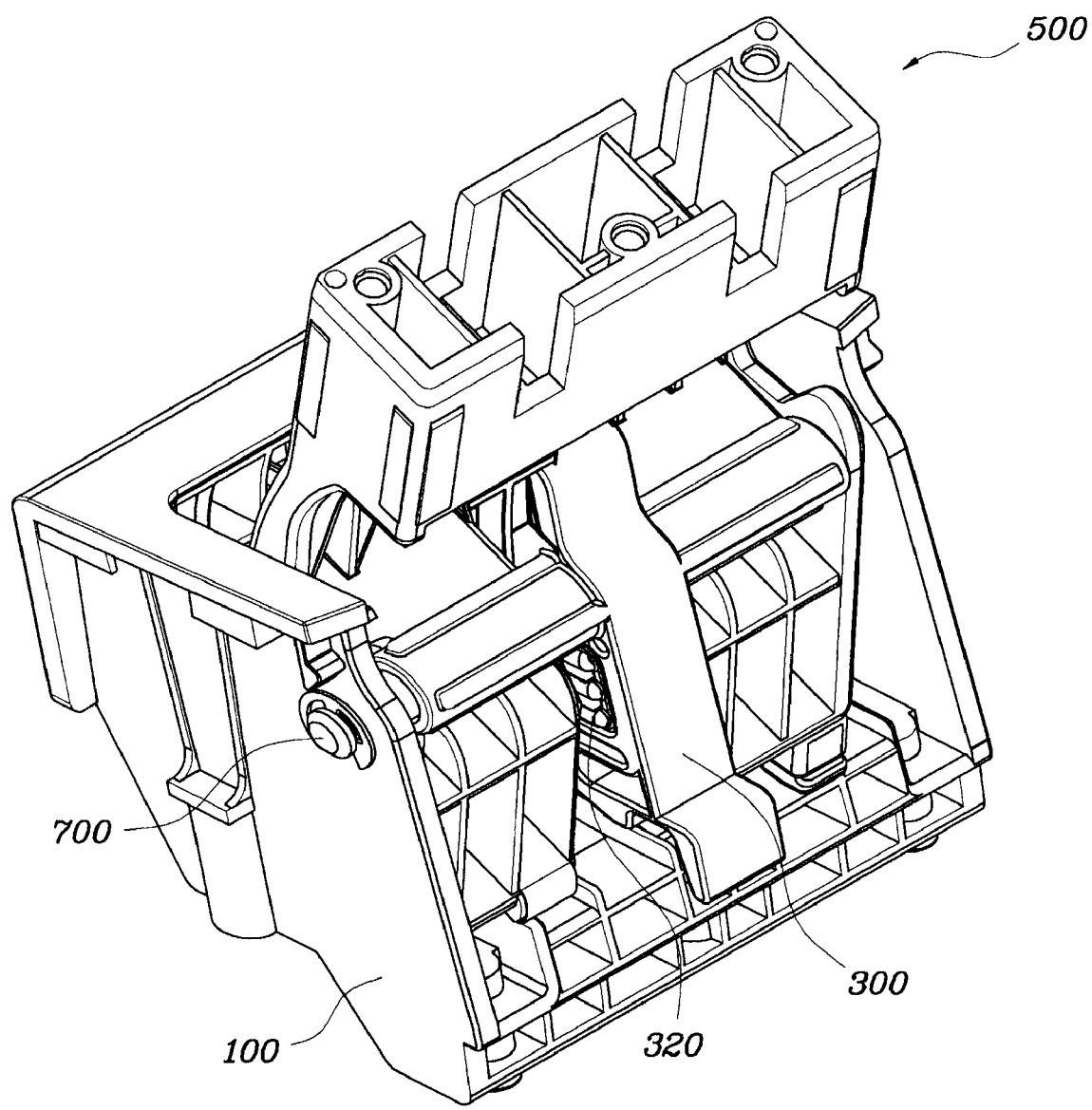
FIG. 6B is a perspective view illustrating a second operation method of the exemplary armrest hinge unit for the vehicle of FIG. 1.

FIG. 6A and FIG. 6B show operation of the armrest hinge unit for a vehicle. FIG. 6A shows the closed state of the armrest cover. FIG. 6B shows the open state of the armrest cover. The armrest cover is fixed to the fixing portion of the upper bracket 500. When the armrest cover is flung open, the upper bracket 500 pivots on the hinge pin 700 inside the lower bracket 100. At this time, the upper bracket 500 pivots while surfaces of the upper bracket 500 and the lower bracket 100 are in plane contact with each other and the inner surfaces of the receiving groove of the upper bracket 500 are in close contact with the rubber members. Accordingly, the upper bracket 500 pivots, generating frictional force. Accordingly, a user must pull up the armrest cover to open the armrest cover. Further, in the case in which the armrest cover is released while it is opening, the armrest cover is not closed by its own weight. Further, when the upper bracket 500 slides upward, since the frictional member 300 is fixed to the lower bracket 100 by the clip portion, the frictional member 300 imparts the frictional force to the upper bracket 500.

For convenience in explanation and accurate definition in the appended claims, the terms "upper", "lower", "front", "rear", and "inner" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An armrest hinge unit for a vehicle, comprising:
    a lower bracket fixed to one side of an armrest container near an opening thereof and including a pivoting-allowable space in the lower bracket;
    a frictional member disposed in the pivoting-allowable space of the lower bracket and fixed to the lower bracket; and
    an upper bracket having a hinge portion hingedly coupled to the lower bracket and a receiving groove to elastically receive the frictional member therein, the upper bracket being connected to an armrest cover,
    wherein at least an inner surface of the receiving groove of the upper bracket is in elastic contact with the frictional member so that a position of the arm rest cover is maintained by frictional force therebetween.

2. The armrest hinge unit for a vehicle according to claim 1, wherein the lower bracket is made of plastic resin through a molding method.

3. The armrest hinge unit for a vehicle according to claim 1, wherein the upper bracket is made of plastic resin through a molding method.

4. The armrest hinge unit for a vehicle according to claim 1, wherein the upper bracket includes a receiving portion received in the pivoting-allowable space of the lower bracket and a fixing portion to which the armrest cover is fixed, at least an outer lateral side surface of the receiving portion is slidably in contact with at least an inner surface of the pivoting-allowable portion.

5. The armrest hinge unit for a vehicle according to claim 1, wherein the frictional member includes a housing and an elastic member installed in the housing and configured to protrude toward the inner surface of the receiving groove of the upper bracket so as to have a contact with the upper bracket.

6. The armrest hinge unit for a vehicle according to claim 5, wherein the frictional member has a semicircular sectional shape.

7. The armrest hinge unit for a vehicle according to claim 5, wherein the elastic member includes at least a groove on at least a lateral surface thereof so that the elastic member can be deformed in being pressed by the upper bracket.

8. The armrest hinge unit for a vehicle according to claim 7, wherein the groove is recessed in a lengthwise direction of the armrest hinge unit.

9. The armrest hinge unit for a vehicle according to claim 7, wherein the groove is formed of a semicircular shape.

10. The armrest hinge unit for a vehicle according to claim 1, wherein the upper bracket has a curved surface having a predetermined curvature around the hinged portion of the upper bracket, and an inner surface of the pivoting-allowable space of the lower bracket is provided with a curved surface for guiding the curved surface of the upper bracket.

11. The armrest hinge unit for a vehicle according to claim 1, wherein a lower end portion of the frictional member is provided with a clip portion which is coupled to the pivoting-allowable space of the lower bracket.

12. The armrest hinge unit for a vehicle according to claim 11, wherein a shock absorbing member is provided between the clip portion and the lower bracket.

13. The armrest hinge unit for a vehicle according to claim 1, wherein the upper and lower brackets are formed by at least a rib arranged and extended in a lattice form so as to maintain inner forms of the upper and lower brackets.

14. The armrest hinge unit for a vehicle according to claim 1, wherein the frictional member includes a center portion having a bar shape extending up to the hinge portions of the upper bracket, the hinge portion of the upper bracket being disposed between the lower bracket and the center portion of the frictional member and a hinge pin penetrating through the lower bracket, the center portion, and the hinge portion.

15. The armrest hinge unit for a vehicle according to claim 1, further includes a rotation prevention member configured to limit an angular range of the upper bracket with a predetermined angle with respect to the lower bracket.

16. The armrest hinge unit for a vehicle according to claim 15, wherein at least a side of a lower end portion of the upper bracket is provided with a guide protrusion, corresponding side of the pivoting-allowable space of the lower bracket is provided with a guide groove which guides a sliding motion of the guide protrusion of the upper bracket, and the guide groove is provided with a stopper protrusion which stops upward sliding motion of the guide protrusions beyond the predetermined angle.

17. The armrest hinge unit for a vehicle according to claim 16, wherein the lower end portion of the upper bracket is provided with a shock absorbing member.

* * * * *